Feb. 20, 1934.   O. LÖBL   1,948,119
METHOD OF AND APPARATUS FOR CONVERTING POLYPHASE
CURRENT INTO SINGLE PHASE CURRENT
Filed June 24, 1931
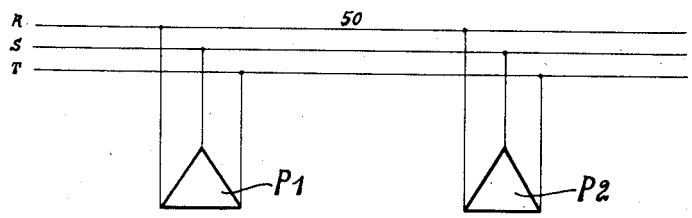
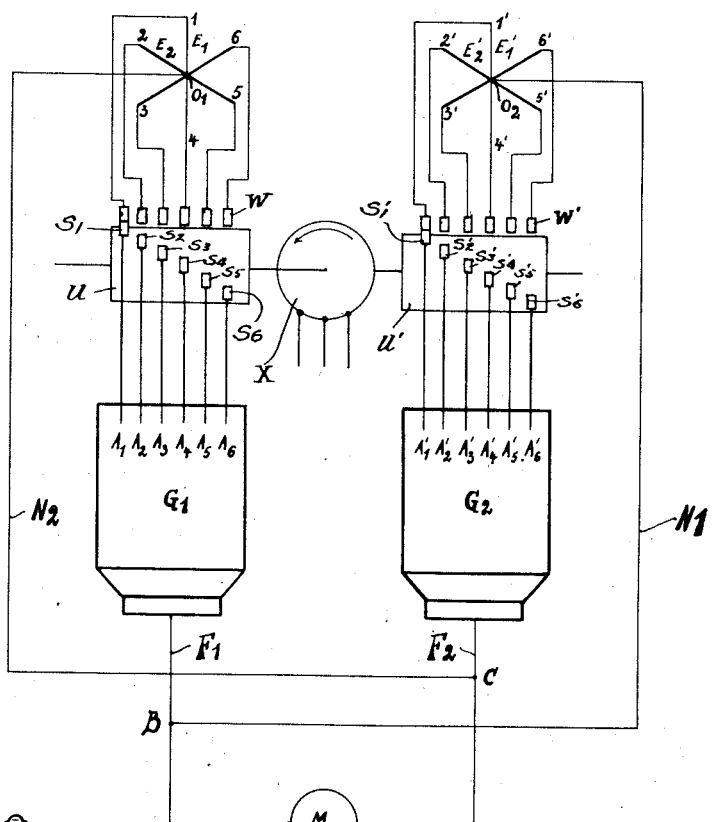
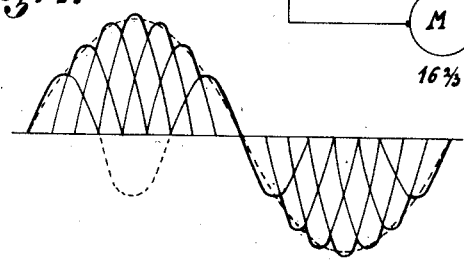

Patented Feb. 20, 1934

1,948,119

UNITED STATES PATENT OFFICE 1,948,119

METHOD OF AND APPARATUS FOR CONVERTING POLYPHASE CURRENT INTO SINGLE-PHASE CURRENT

Oskar Löbl, Berlin-Hermsdorf, Germany

Application June 24, 1931, Serial No. 546,658, and in Germany April 18, 1931

3 Claims. (Cl. 172—238)

This invention relates to a method of converting polyphase current of a given frequency into single-phase current of a smaller frequency by means of at least two m-phase systems of rectifiers which may consist of gas discharge or other electric rectifying valves of which one system furnishes one half-wave and the other system the other half-wave of the single-phase current. Essentially my invention consists therein that counter-E. M. F.'s are introduced into the temporarily closed circuits of the rectifier to permit larger phase displacements between the E. M. F. and the current in the single-phase circuit while avoiding short-circuits within said rectifiers.

It has been proposed to convert polyphase current of a given frequency into single-phase current of a smaller frequency and of sinusoidal or other shape by means of two polyphase systems of rectifiers, such as gas discharge gaps or other rectifying valves, one system furnishing the one and the other system the other half-wave of the single-phase current. The single-phase current in such case is composed of portions of polyphase currents of subsequent phases and currents of proper current-strength and sequence of phase are supplied to the anodes, while single-phase current is taken off the cathodes. Proper control of the anode currents in the rectifier may be effected in any desired manner, for instance, by means of a mechanical switch, an electric arc or also by means of a grid bias. In order to generate a single-phase current following a definite form of curve, polyphase currents having different maximum values of E. M. F. may eventually be used. For this purpose the rectifiers may be supplied from transformers having stepped phase windings, or in case of an even number of winding turns in the phase windings portions of different maximum values of the E. M. F. may be cut out of the E. M. F. curve by properly controlling the grid voltage.

This known method of conversion makes use of two m-phase systems of rectifiers of which each generates one half-wave of the single-phase current, the two half-waves being united into a full wave of the desired frequency and form of curve. Uniting the two half-waves in this manner, however, can be immediately carried out only in case the power-factor is equal to unity or at least in proximity to unity, as otherwise internal short-circuits will arise. My invention relates to a method of converting polyphase into single-phase current permitting, even in case of larger phase displacements, proper conversion of polyphase into single-phase current and without the production of short circuits in the rectifier.

The counter-E. M. F.'s which are introduced according to my invention into the short-circuits of the rectifiers are preferably taken from the secondary windings of the transformers which supply current to the system of rectifiers. This may, for instance, be done by controlling the anode currents of both of said systems of rectifiers in a definite sequence.

In the accompanying drawing I have shown in Fig. 1 thereof how the single-phase current may be generated according to my invention, while Fig. 2 is a diagram of connections showing one form of my new rectifying apparatus.

As Fig. 2 shows, my present rectifying apparatus comprises two systems of six-phase rectifiers $G_1$ and $G_2$. In order to generate the different maximum values of the E. M. F. of the polyphase current, transformers are used having primary windings $P_1$ and $P_2$ and secondary windings 1, 2, 3, 4, 5, 6 and $1'$, $2'$, $3'$, $4'$, $5'$, $6'$, respectively. Interposed between the secondary windings of the transformers and the rectifiers are switches which in principle may be of any desired construction. In the drawing these switches are represented by switch levers $S_1$, $S_2$, $S_3$, $S_4$, $S_5$, $S_6$ and $S_1'$, $S_2'$, $S_3'$, $S_4'$, $S_5'$, $S_6'$, respectively. From these switches current is supplied to the anodes $A_1$, $A_2$, $A_3$, $A_4$, $A_5$, $A_6$ and $A_1'$, $A_2'$, $A_3'$, $A_4'$, $A_5'$, $A_6'$, respectively, of the rectifiers $G_1$ and $G_2$. The cathodes $F_1$ and $F_2$ are connected by leads $N_1$ and $N_2$ with the neutral or star points of the secondary windings of the transformers, the single-phase current consumption device M being interposed between said leads $N_1$ and $N_2$. It is assumed that the polyphase currents have a periodicity of 50 while the single-phase current has a periodicity of $16\frac{2}{3}$ as indicated on the drawing.

In order to more fully explain my invention, the critical moment may be considered at which the single-phase current passes from the one to the other half-wave, that is from the rectifier $G_1$ to the rectifier $G_2$. E. M. F. and current are assumed as being positive, if the current flows in direction towards the anodes. At the moment in which the E. M. F. in the phase winding $1'$ has attained its positive maximum, the E. M. F. in the phase winding 1 will be at its negative maximum. If there is no phase displacement between the E. M. F. and the current of the single-phase circuit, the current in the anode $A_1$ will become zero at the moment at which the anode is commencing to operate and transfer of current to the rectifier $G_2$ will consequently be accomplished fully unimpeded. If there is, however, a phase displacement of 90° between the E. M. F. and the current on the single-phase side, the current in the anode $A_1$ will yet have its maximum value, if the E. M. F. $E_1$ has come to its zero value. During closing the switch $S_1'$ the E. M. F. $E_1$ commences to increase in negative sense, while simultaneously therewith the E. M. F. $E_1'$ increases in positive sense, the current in the anode $A_1$ continuing to flow. If now switch $S_2'$ is closed, a short-circuit will be established between $O_2$, $A_2$, $C$, $O_1$, $A_1$, $B$, $O_2$, the value of $E_2'$ being now in excess of the value of $E_1$. In order to prevent this short-circuit, according to my invention counter-E. M. F.'s are introduced which, for instance, may be done as follows: About simultaneously with the switch $S_2'$ switch $S_2$ is closed and switch $S_1'$ is opened so that the current may continue to flow past the anode $A_2$, the two E. M. F.'s $E_2$ and $E_2'$ now balancing each other, thus preventing the short-circuit. Similarly the other corresponding switches in the anode circuits of the respective rectifiers are consecutively closed so that the phase-displaced current may continue to freely flow until it reaches its zero value. When operating on inductive current charge, the switches 1 to 6 corresponding with the different phases of the rectifiers are consecutively closed as above explained, and then starting again with the switches of phase 1, said switches to phase 4 are consecutively closed. When operating on capacitive current charge, a different sequence is observed and the switches for phase 4 are first closed, proceeding to phase 6, and then beginning with phase 1, consecutively closing the switches to phase 6.

As has above been explained, all instrumentalities which are able to control anode currents may be used for the operation of switching, that is all kinds of mechanical switches, such as for instance, drum controllers equipped with contact rings, ring segments and brushes bearing on said controllers, or switches operating on the principle of the electric arc, controlled ignition coils, grids and the like. My improved method of converting polyphase into single-phase current of a smaller frequency may be carried out by means of at least two m-phase systems of rectifiers of any desired kind.

In Fig. 2 of the drawing, I have shown one form of operating means for the switches in the anode circuits of the rectifiers, in which the movable switch elements are mounted on the rotary drums $u$ and $u'$ respectively, and are adapted to be engaged by the stationary brushes $W$, $W'$ connected in the secondary circuits of the respective transformers. The movable switch elements or contacts may, of course, be adjustably mounted upon the rotary drum in any preferred manner for the purpose of closing the circuits in predetermined order as above referred to. The drums are preferably operated by a synchronous motor indicated at $x$.

I claim:

1. In the conversion of polyphase current of a given frequency into single-phase current of a smaller frequency, by means of two multiphase systems of rectifiers, each supply one-half of the single-phase current wave; the method step which consists in introducing into the single-phase current circuit counter-balancing electro-motive forces to prevent short circuits in the rectifiers incident to phase displacement.

2. In the conversion of polyphase current of a given frequency into single-phase current of a smaller frequency, by means of two rectifiers each having a transformer associated therewith provided with multiple secondary phase windings and each rectifier supplying one-half of the single-phase current wave; the method step which consists in introducing from the secondary windings of the transformers counter-balancing electro-motive forces into the single-phase anode circuit of the rectifiers to thereby prevent short circuits in the rectifiers incident to phase displacement.

3. In apparatus for converting polyphase current of a given frequency into single-phase current of a smaller frequency, including two rectifiers and a transformer associated with each rectifier having multiple secondary phase windings connected in the anode circuits of the respective rectifiers; a switch interposed in each of said circuits, the corresponding switches in the circuits of the respective rectifiers being operable to closed positions in predetermined sequence to introduce counter-balancing electromotive forces from the secondary windings of the respective transformers into the single-phase current circuit to thereby prevent short circuits in the rectifiers incident to phase displacement.

OSKAR LÖBL.